United States Patent [19]
Blackmer et al.

[11] 3,765,237
[45] Oct. 16, 1973

[54] CALORIMETRY

[75] Inventors: David E. Blackmer, Eldon A. Boling, Brookline, both of Mass.

[73] Assignee: Instrumentation Laboratory, Inc., Lexington, Mass.

[22] Filed: Apr. 6, 1971

[21] Appl. No.: 131,675

[52] U.S. Cl............ 73/190 R, 195/103.5, 195/127, 219/400, 219/499
[51] Int. Cl......................... G01k 17/00, C12k 1/04
[58] Field of Search ................. 73/15, 190; 23/253, 23/259; 195/103, 127, 370; 219/400, 499, 501, 505

[56] References Cited
UNITED STATES PATENTS

| | | | |
|---|---|---|---|
| 3,537,294 | 11/1970 | Stone | 73/15 |
| 3,215,816 | 11/1965 | Perl | 219/400 |
| 3,476,914 | 11/1969 | Cvssen | 219/499 |
| 3,360,993 | 1/1968 | MacMillan | 73/15 |
| 3,643,491 | 2/1972 | Dell et al. | 73/15 |
| 3,564,900 | 2/1971 | Andre et al. | 73/17 |
| 3,453,866 | 7/1969 | Simon | 73/15 |
| 3,033,020 | 5/1962 | Pakulak, Jr. et al. | 73/15 |
| 3,365,944 | 1/1968 | Hoagland et al. | 73/190 |
| 3,059,471 | 10/1962 | Calvet | 73/190 |

*Primary Examiner*—Herbert Goldstein
*Attorney*—Willis M. Ertman

[57] ABSTRACT

Microcalorimetry apparatus includes a chamber in which a plurality of samples to be analyzed are supported. The chamber is surrounded by thermal insulation at least a portion of which is porous. Air at an accurately controlled temperature is supplied to the chamber under positive pressure to cause continuous exhausting of air through the porous insulation. A reference sensor is disposed in the chamber and provides a reference signal to accelerate equilibration of the samples in the chamber. The apparatus is particularly useful in detecting bacterial growth by sensing the heat production in the samples under analysis and sensing for a positive derivative of the rate of heat production in the samples.

18 Claims, 11 Drawing Figures

3,765,237
SHEET 1 OF 5
FIG 1
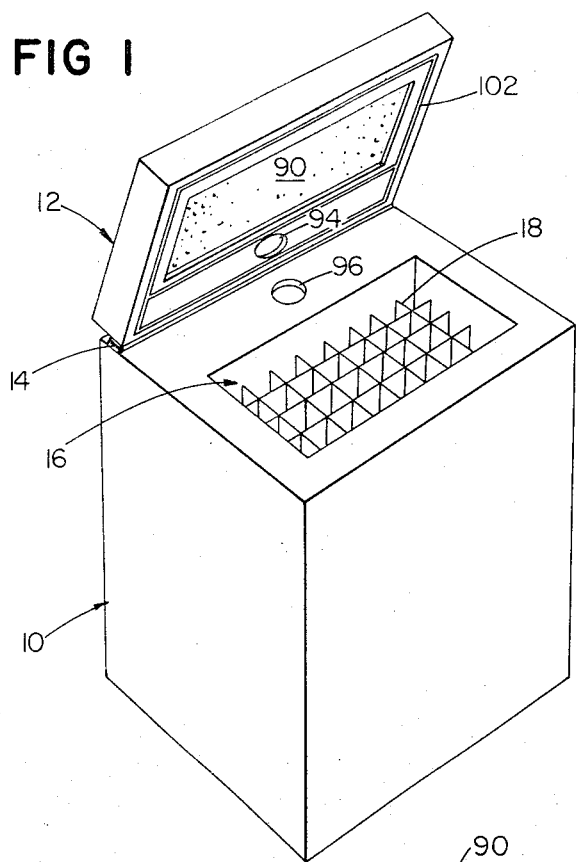
FIG 2
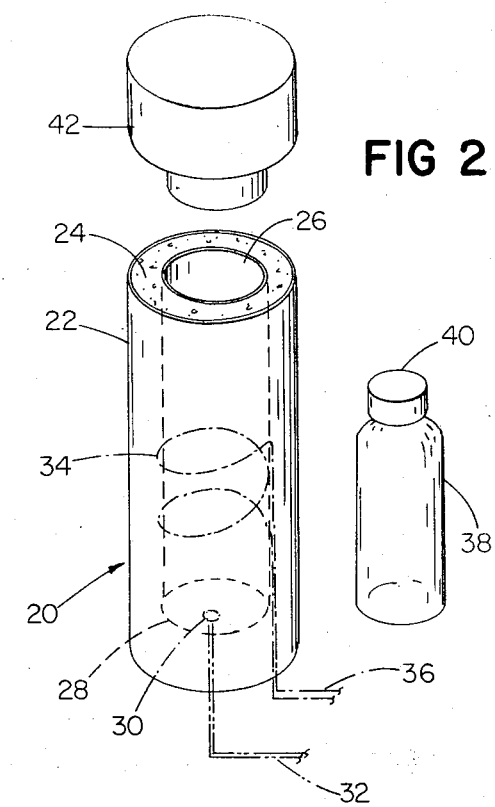
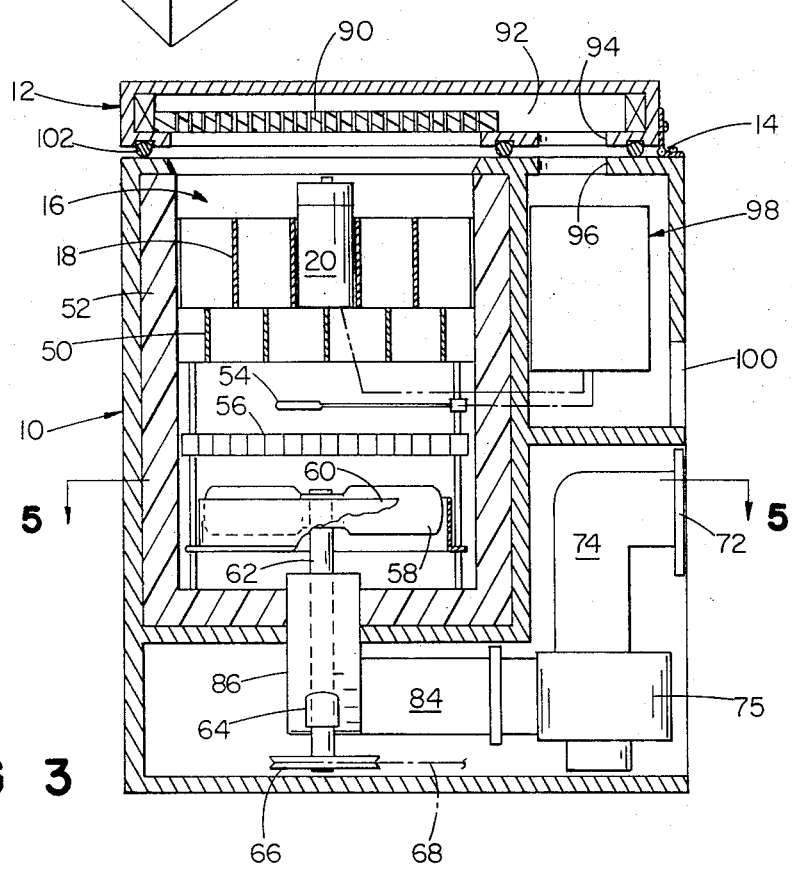
FIG 3

CALORIMETRY

SUMMARY OF INVENTION

This invention relates to calorimetry and calorimeters and more particularly to microcalorimetry, and to methods and apparatus employing microcalorimetry and biochemical analyses.

Calorimetry techniques provide useful information in a variety of analyses. A particularly useful area is in biochemistry. Many of the prior art calorimeters have not been satisfactory for such investigations, either because they lack accuracy due to simple construction or while reasonably accurate are of extremely complex design. It is an object of this invention to provide novel and improved microcalorimetry apparatus which provides useful measurements of heat and yet is relatively easy to use.

It is also an object of this invention to provide novel and improved methods of detecting bacterial growth. A problem which commonly may arise in detecting bacteria or other microbiological growth by calorimetric techniques is that there may be, coexistent with the bacteria in the calorimeter, other systems which produce heat during a period of measurement. Examples of such other systems are enzyme substrate systems, or one or more populations of living but non-dividing cells, e.g. blood erythrocytes and blood leucocytes. In accordance with this aspect of the invention, the measurement involves sensing for a positive derivative of the rate of heat production with respect to time. The rate of heat production by a population of dividing microbiological cells always increases during a substantial interval of time. The increase in an exponential function of time during that period and the rate of heat production at any time during that period is directly proportional to the mass of cells present in the population. As the result of these differences in rate of heat production by different types of systems, it is possible to distinguish heat production by growing microbiological cell populations from heat productions due to other systems as the rate at which such other systems produce heat can remain steady or it can decrease but the rate of heat production by such other systems does not increase.

In a preferred form of microcalorimetry apparatus, there is provided an insulated chamber, at least a portion of the wall thereof being porous. One type of porous insulating material is open cell polyurethane foam which permits a relatively free flow of gas since 90 percent or more of the cells in the foam communicate with each other. There is provided in the chamber means to support a sample to be analyzed. A conditioning gas (usually air) is heated prior to introduction into the chamber ot a uniform predetermined temperature and the gas is introduced into the chamber under a positive pressure so that a pressure differential is maintained across the porous insulating wall so that there is a continuous flow of gas through the porous chamber wall. The flow of gas is maintained at a sufficiently high rate, in a particular embodiment employing a chamber of 7 cubic feet volume a flow of gas of 25 feet per minute is employed, the gas flow is sufficiently great to overcome convection forces and the temperature of the inside wall of the chamber is virtually identical with the temperature of the gas entering the chamber so that the inner surface of the chamber wall is isothermal with that of the conditioning gas.

In a particular embodiment, the gas is introduced through a series of controlled heating stages with each stage controlled by an individual controller and feedback and gain optimized for the physical characteristics of the system to permit proportional control with a maximum of amplifier gain. A fan circulates the air within the chamber (the fan being driven by a drive external to the chamber) and the heated gas escapes through the porous wall.

In this particular embodiment a multiplicity of calorimeter units are provided, each calorimeter unit including an insulated container for receiving the sample to be analyzed, a thermal sensor, and a heater structure for accelerating the equilibration of the sample to the predetermined system temperature. Further, in this embodiment, the chamber is closed by a hinged lid in which the porous insulated wall is disposed and disturbance on opening the system (reduction to air flow resistance) is relatively minor, and the system returns to stable temperature condition rapidly after the cover is reclosed. Also, in this embodiment, the air exhausted from the chamber is passed through the electronics compartment thus maintaining the electronic components at a stable temperature.

A variety of techniques can be employed for processing the data to sense for a positive derivative of the rate of heat production in the sample. In a particular embodiment data reduction can be obtained with a digital computer. The data from the individual channels is conditioned, smoothed, and evaluated with respect to the derivative of the rate at which heat is produced. Alternatively, analog methods of data acquisition and analysis may be used.

The calorimeter devices of the preferred embodiment are able to detect heat production in a 50 gram sample of water at a rate of less than 3 microwatts, less than 0.1 percent of the power produced in a typical growing population of microbiological cells in a sample of that volume. The system requires minimum adjustment operations by the technician. Safety circuits such as circuits which require air flow before the heaters can be operated and maximum temperature sensors which shut down the system should the air temperature exceed a predetermined value are incorporated in preferred embodiments. The apparatus is automatic in operation and no adjustments of any kind are required of the operating technician. Once a bottle is placed in a calorimeter unit, it is automatically forced into equilibration and the resulting data is processed and analyzed by well known data handling and storage techniques, either on a real time or a delay basis for the presence or absence of microbiological growth.

Other features, objects and advantages of the invention will be seen as the following description of a particular embodiment progresses, in conjunction with the drawings, in which:

FIG. 1 is a perspective view of apparatus constructed in accordance with the invention;

FIG. 2 is a perspective view of an individual sample chamber and support structure for that sample chamber;

FIG. 3 is a sectional side view of the apparatus shown in FIG. 1;

DESCRIPTION OF PARTICULAR EMBODIMENT

Figure 4:
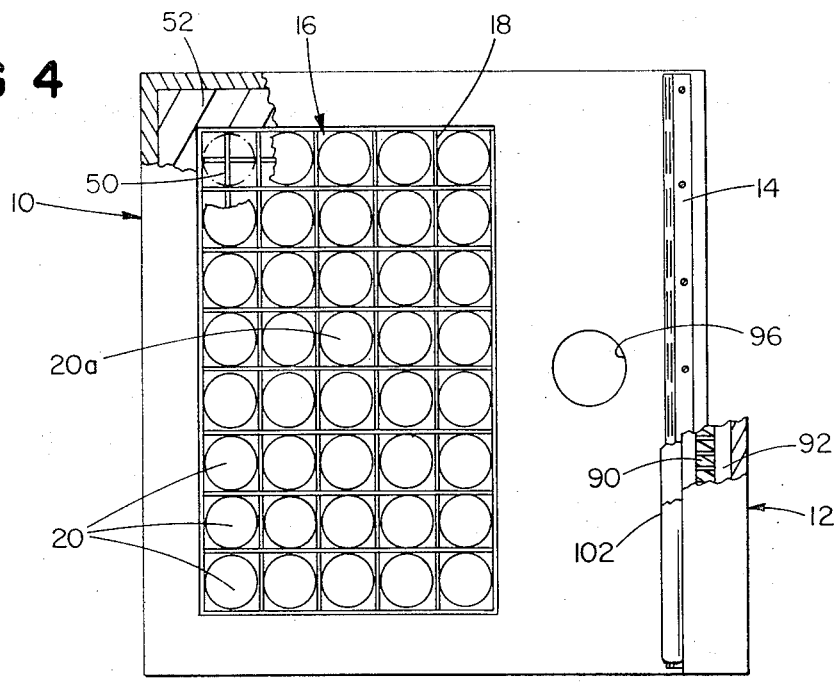
FIG. 4 is a top view of the apparatus shown in FIG. 1 with the cover open and parts broken away.

The calorimetry apparatus shown in FIG. 1 includes a cabinet body 10 and cooperating cover structure secured to body 10 by hinge 14. The cabinet body defines a chamber 16 that has a width of about 1 ⅓ feet, a length of about 2 ⅓ feet and a depth of about 2 ⅓ feet. The bottom and side walls of this air bath chamber 16 are insulated by rigid polystyrene foam 52 2 inches in thickness. Disposed in the cover 12 is a porous polyurethane foam layer 90 through which air passes on its way out of the air bath chamber 16. At the upper end of chamber 16 is disposed a set of aluminum dividers 18 that define 40 spaces (in a five by eight array) for receiving corresponding calorimeter assemblies of the type shown in FIG. 2.

Each such assembly 20 includes a cylindrical outer housing 22 which in this embodiment is 3 ½ inches in diameter and 6 inches in length. Foamed in place polyurethane insulation 24 supports cylindrical aluminum inner container 26 that is 5 inches in length and 2 inches in diameter with a cylindrical wall thickness of 0.008 inch. The base 28 of inner cylinder 26 is an aluminum plate ¼ inch in thickness to which is secured a thermistor sensor 30 having output leads 32. A resistance wire heater winding 34 is wrapped around aluminum cylinder 26 and has external leads 36. A sample container 38 with cap 40 is arranged for sliding fit within inner container 26 to make good thermal contact with the side walls and base of the inner container 26. The calorimeter assembly is closed by a cap 42 of polyurethane foam.

As shown in FIGS. 1 and 3, the calorimetry assemblies 20 rest on support structure 50 in chamber 16. Below support 50 is a temperature sensor 54, baffle structure 56, and a 15 inch diameter fan 58 disposed in cylindrical fan shroud 60. Fan 58 is mounted on shaft 62 which passes through insulated bushing 64 and to which is secured a drive pulley 66 and is connected to drive motor 70 located externally of chamber 16 by drive pulley 66 and drive belt 68.

Figure 5:
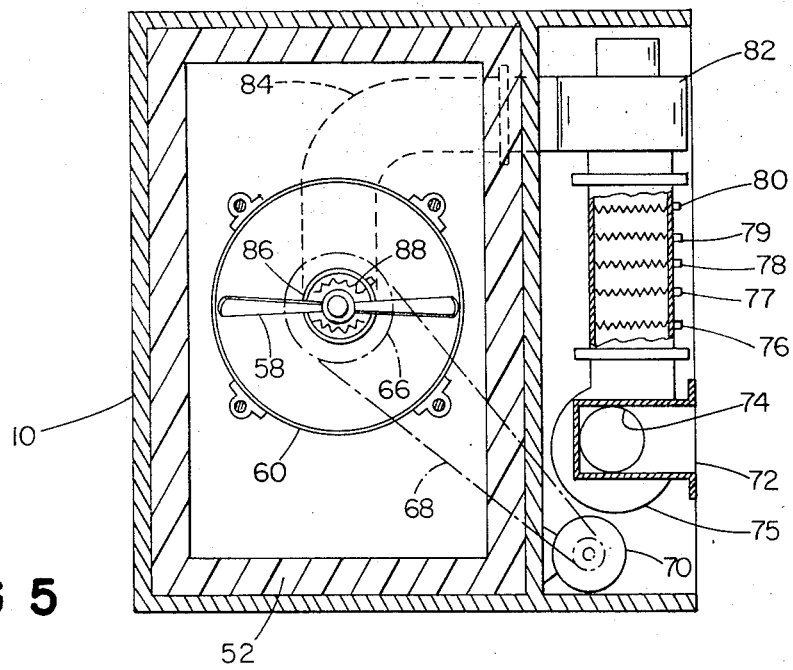
FIG. 5 is a sectional view of the apparatus shown in FIG. 1 taken along the line 5—5 of FIG. 3.

As indicated in FIGS. 3–5, air is introduced through inlet 72 to flow through passage 74, a first blower 75, five heater stages (each with its associated temperature sensor) diagrammatically shown at 76–80 and a second blower 82, and conduits 84 and 86 into chamber 16 below fan 58. The air flow is circulated within chamber 16 and passes upward past supports 50 and spacers 18 for passage through porous insulation wall 90 and passage 92 in cover 14 to port 94 that is 4 inches in diameter. The air flow from port 94 passes through a second four inch port 96 into electronics compartment 98 and then out exhaust port 100 in the rear wall of the cabinet body 10. Gaskets 102 are secured to the lower surface of cover 12 and provide a seal of chamber 16 when the cover is closed and also provide a seal around port 94.

A top view of the array of 40 calorimeter assemblies 20 in chamber 60 is shown in FIG. 4. Calorimeter 20a is a reference calorimeter and its thermistor is connected to reference channel circuitry.

Figure 6:
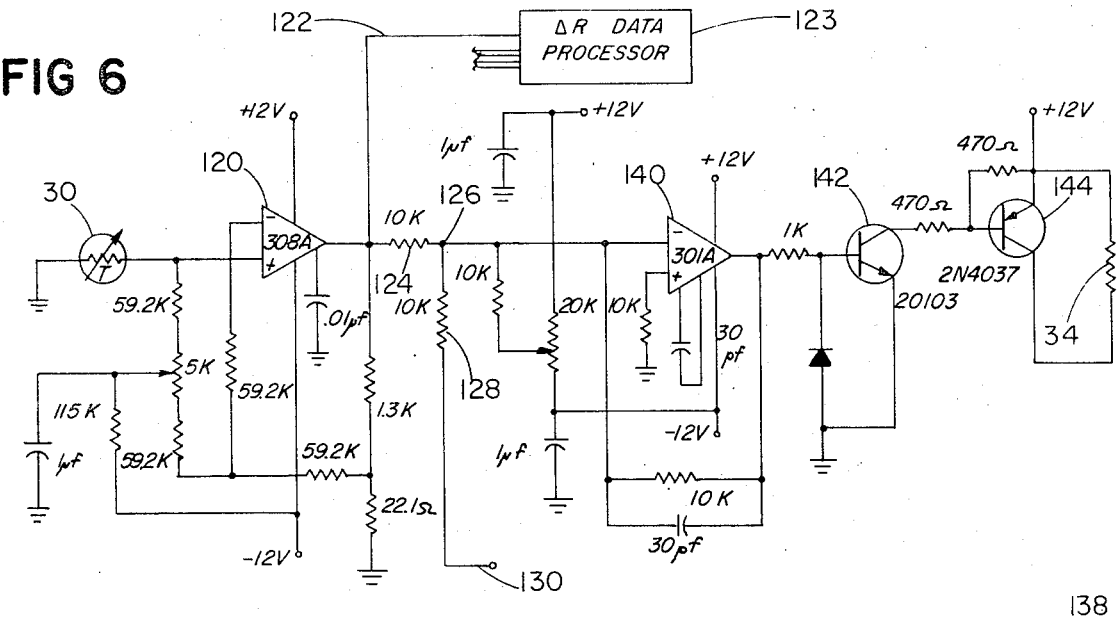
FIG. 6 is a schematic diagram of the electronics controlling the heater of a sample container.
Figure 7:
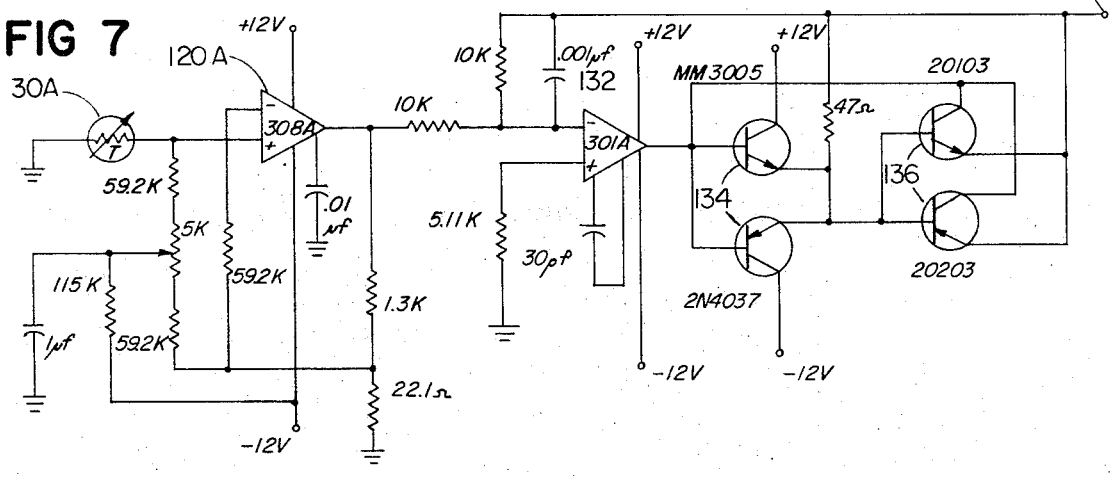
FIG. 7 is a schematic diagram of the electronics responsive to the sensor of a reference container.

A circuit diagram of the sensor and reference channels associated with the calorimeter units 20 are shown in FIGS. 6 and 7. Each thermistor 30 of the 39 calorimeter units is connected in a bridge circuit and the output of the bridge circuit is fed to the non-inverting input of an operational amplifier 120. As indicated in FIG. 6, the output of the measuring calorimeter circuit is connected via output terminal 122 to data processing ($\Delta R$) apparatus 123 such as a digital computer which is used for data reduction and analysis to detect microbiological growth. The output of each of these channels is also connected through resistor 124 to a summing junction 126. A second signal to that summing junction is applied through resistor 128 and terminal 130 from the reference channel that includes thermistor 30a in a similar bridge circuit as shown in FIG. 7. The output of that thermistor bridge circuit is fed to operational amplifier 120a and through an operational amplifier 132 that functions as a 1:1 inverter to a transistor amplifier stage that includes a first set of transistors 134 and second set of transistors 136 to supply current at terminal 138 to all the terminals 130 of the sensing calorimeter and the summing junctions 126. The difference signal from that summing junction is applied to operational amplifier 140 and its output drives transistor amplifiers 142, 144 to control the heater winding 34 that is wound around the outside of each calorimeter inner container 26. When a new sample is inserted into the calorimeter, this circuitry forces the calorimeter unit temperature to rapidly approach the temperature of the reference calorimeter. Power is provided to the calorimeter heater 34 and the sample temperature rises asymptotically to the reference temperature. This circuitry thus forces an individual sample into temperature equilibrium at the selected temperature, e.g., 37°C.

Figure 8:
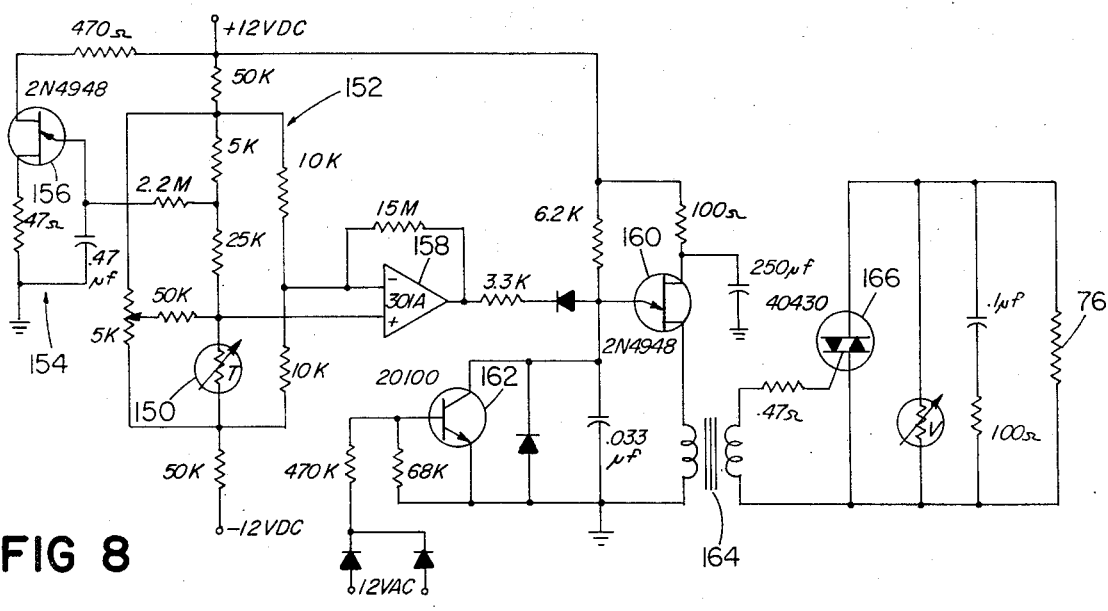
FIG. 8 is a schematic diagram of electronics employed in a heater stage.

Circuitry for the control of heater stage 76 is shown in FIG. 8. Similar circuitry controls each of the other heater stages 77–80. Each heater is driven by an individual heater control with its own sensor (e.g., thermistor 150) suspended in the air stream downstream from the heater stage. Thermistor 150 is connected in bridge circuit 152 to which DC voltage is applied. Superimposed on the DC voltage powering bridge 152 is a small amplitude 12 Hertz sawtooth signal generated by ramp generator circuit 154 that includes unijunction transistor 156. The output of the bridge is applied to an operational amplifier 158 which in turn drives unijunction transistor 160 under the control of zero crossing circuit that includes transistor 162. The output pulses from transistor 160 are coupled by transformer 164 to control triac thyristor 166 which in turn controls heater 76. The zero crossing mode of operation provides individual output pulses from the thyristor 166 that are substantially complete half wave signals of AC power and essentially eliminates radio frequency interference. The low frequency sawtooth signal provided by circuit 154 causes a time modulation of the power pulses from the thyristor 166 and enables proportional operation of the heater. The gain of amplifier 158 is adjusted to obtain optimal proportional operation for the required temperature.

Figure 9:
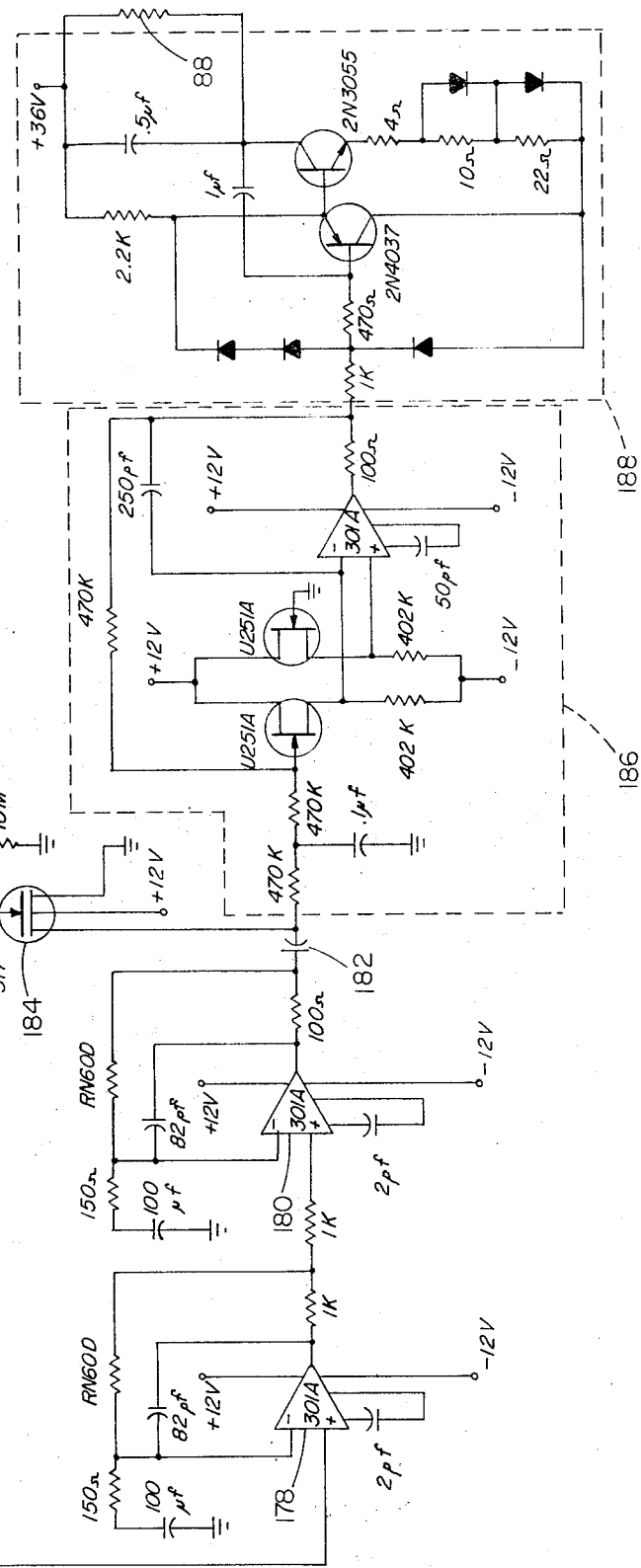
FIG. 9 is a schematic diagram of electronics of a final heater stage.
Figure 9:
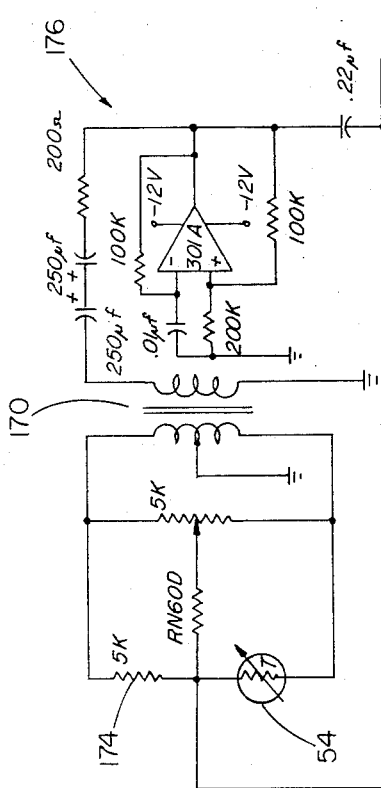

The circuitry of the final heater 88 is shown in FIG. 9. In this controller, two arms of a temperature sensing bridge are formed by closely matched secondary windings of transformer 170. The other two arms are formed by the temperature sensor 54 (a nickel resistor) and a wire wound resistor 174. The bridge is excited by square wave oscillator 176 operating at a frequency of about 1 kilohertz. The error output signal of the bridge is amplified by a two stage AC amplifier including operational amplifiers 178 and 180 and the resulting signal is coupled by capacitor 182 and after synchronous demodulation via field effect transistor 184 is passed through filter stage 186 and DC power amplifier stage 188 to control the final heater winding 88.

Figure 10:
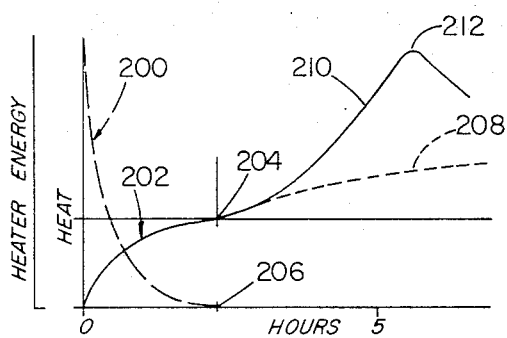
FIG. 10 is a graph of a typical response of the heater system and output of a sample chamber having a biological specimen therein.

The graph in FIG. 10 indicates operation of a typical calorimeter heater after a sample container 38 is inserted. When the container 38 is inserted, full heater power is turned on.

After a few minutes, the heater power begins to reduce as indicated by the line 200 as the calorimeter temperature (line 202) approaches its baseline 204 (37°C). After the equilibration period, the calorimeter heater 34 ceases operation at point 204. (The calorimeter heater operates in only when the temperature of the sample calorimeter is below that of the reference calorimeter 20a.) When the heater turns off, a calorimeter measurement analysis is started. If bacteria free blood is placed in sterile nutrient media of the type employed in culturing bacteria, which media typically contains the necessary elements and substrates for blood cell metabolism, the blood cells produce heat by their various metabolic processes, as indicated by the line 208. However, since the blood cells do not multiply, the rate of heat production remains constant or decreases as conditions become less favorable with time. In contrast, if living bacteria are placed in the sterile nutrient media, the bacteria multiply and heat is produced at an increasing rate as indicated by curve 210 until conditions for growth become less favorable and heat is produced at a decreasing rate subsequent to peak 212.

Figure 11:
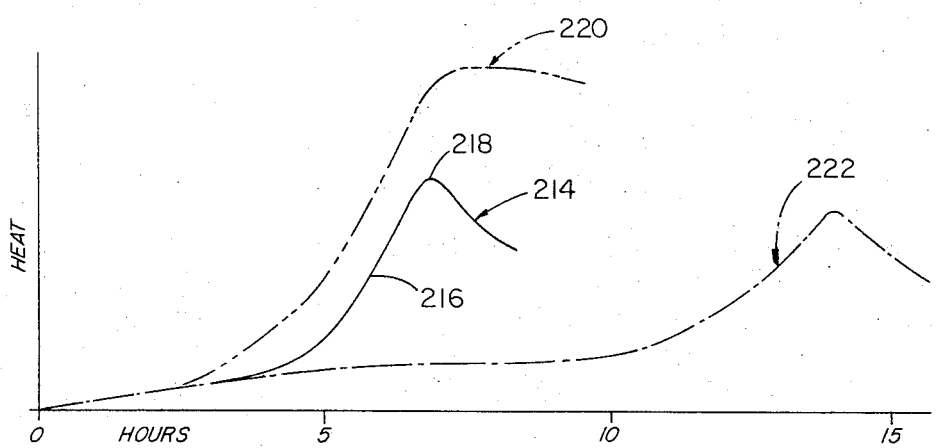
FIG. 11 is a graph indicating the relationship between heat generated in a system that includes blood alone or in a system which the sample includes blood and bacteria.

A comparison of specific bacteria is indicated in FIG. 11. Curve 214 indicates the sensed heat output of escherischia coli in a BHI broth, the curve haing a positive slope at 216 and a peak 218. Curve 220 indicates the sensed heat output of escherischia coli in thiglycollate broth while curve 222 indicates the sensed heat output of $\alpha$-hemolytic streptococci in a BHI broth. It will be noted that each of these curves has a positive $\Delta R$ portion. A variety of different techniques can be employed for analyzing the data. For example, an analog circuit can be used to take derivative of the rate of heat production using an analog differentiator. The method employed in this embodiment is to sense the change in heat production between a series of successive measurements at fixed intervals of time ($\Delta T$). As each new measurement is made, a new rate of temperature change value ($\Delta R$) is compared with the previous $\Delta R$ value. A digital computer, diagrammatically indicated at 123, is used to process data from the 39 sample channels in the preferred embodiment. In an ideal system of a population of dividing microbiological cells, heat is produced at a constantly increasing rate so that each successive $\Delta R$ value will be greater than the $\Delta R$ value immediately preceding it, and the curve thus having a positive derivative characteristic indicative of bacterial growth.

While a particular embodiment of the invention has been shown and described, various modifications thereof will be apparent to those skilled in the art and therefore it is not intended that the invention be limited to the disclosed embodiment or to details thereof and departures may be made therefrom within the spirit and scope of the invention as defined in the claims.

What is claimed is:

1. Microcalorimetry apparatus comprising structure defining a chamber, including structure defining a gas flow inlet passage connected to said chamber and a gas flow outlet passage connected to said chamber,
   a plurality of calorimeter units supported in said chamber in spaced relation to one another, each said calorimeter unit comprising structure of thermal insulation defining a compartment for receiving a sample container, thermally conductive structure in said compartment, said thermally conductive structure being configured to mate with the outer wall of said sample container so that said thermally conductive structure and said container are in thermal contact,
   means in contact with said thermally conductive structure for supplying heat to said compartment,
   a unit temperature sensor secured to said thermally conductive structure for providing an output signal as a function of the heat content of material in said compartment,
   terminal means for connecting said heat supply means and said temperature sensor to electrical circuitry external of said thermal insulation,
   and thermally insulated closure structure cooperative with said compartment defining structure for enclosing a sample container within said compartment,
   thermal insulation enclosing said chamber,
   means to continuously supply gas along a gas flow path from said gas flow inlet passage through said chamber to said gas flow outlet passage to maintain a positive pressure in said chamber sufficient to cause continuous flow of gas through said chamber and around said individual spaced calorimeter units, and means to stabilize the temperature of the gas continuously supplied to said chamber.

2. The apparatus as claimed in claim 1 and further including a reference temperature sensor in said chamber for providing a reference signal and electronic circuitry connected to said unit temperature sensor, said reference temperature sensor and said heat supply means for comparing said unit sensor output signal and said reference signal and controlling the application of heat to said thermally conductive structure of the calorimeter unit for equilibration of a sample disposed therein.

3. The apparatus as claimed in claim 1 wherein said chamber has a cover member and further including porous insulation in said cover member connected to said gas flow outlet passage.

4. The apparatus as claimed in claim 1 wherein said means to stabilize the temperature of said gas includes a plurality of heater stages disposed in series in said gas flow inlet passage, each said heater stage having an associated temperature sensor and circuitry responsive to its associated temperature sensor for controlling the heater stage.

5. The apparatus as claimed in claim 1 wherein said means to stabilize the temperature of said gas includes a temperature sensor disposed in said chamber and a heater stage responsive to said temperature sensor, said heater stage including a heater element and a bridge network, said sensor being connected in said bridge network, and said heater stage further including circuitry for applying an AC signal to said bridge network for modulating the error signal of the bridge network and synchronous demodulation circuitry connected between said bridge network and said heater element for controlling the energization of said heater element.

6. The apparatus as claimed in claim 1 wherein said means to stabilize the temperature of said gas includes a series of heater stages in said gas flow inlet passage and the gas is exhausted from said chamber through said gas flow outlet passage into an electronics compartment housing electronic control circuitry for stabilizing the thermal environment in said electronics compartment.

7. The apparatus as claimed in claim 1 and further including fan means and a series of heater stages disposed in said gas flow inlet passage, each said heater stage having an associated temperature snesor, the sensor associated with the final heater stage being disposed in said chamber, and electronic circuitry responsive to each sensor for controlling the associated heater element, said electronic circuitry being disposed in an electronics compartment and said gas, after being exhausted from said chamber through said gas flow outlet passage, flows into said electronics compartment for stabilizing the thermal environment in said electronics compartment.

8. The apparatus as claimed in claim 7 and further including a reference sensor in said chamber connected to provide a reference signal for equilibration of the samples in said calorimeter unit.

9. Microcalorimetry apparatus comprising structure defining a chamber,
- a calorimeter unit in said chamber, said calorimeter unit comprising structure of thermally conductive material defining a compartment for receiving a sample container, the inner wall of said thermally conductive structure being configured to mate with the outer wall of said sample container so that said inner and outer walls are in thermal contact,
- thermal insulation surrounding said thermally conductive structure,
- heater means in contact with said thermally conductive structure for aupplying heat to said compartment,
- a temperature sensor secured to said thermally conductive structure for providing an output signal as a function of the heat content of material in said compartment,
- terminal means for connecting said heater means and said temperature sensor to electrical circuitry external of said thermal insulation,
- and thermally insulated closure structure cooperative with said thermally conductive structure for enclosing a sample container within said compartment,
- thermal insulation enclosing said chamber,
- means to supply gas to said chamber along a gas flow path and means to stabilize the temperature of the gas supplied to said chamber, said means to stabilize the temperature of said gas including a temperature sensor and a heater stage responsive to said temperature sensor, said heater stage including a bridge network in which said temperature sensor is connected, zero crossing circuitry, ramp generator circuitry connected to said bridge network for modulating the output of said bridge network, amplifier circuitry responsive to the outputs of said bridge network and said zero crossing circuitry, and a heater element responsive to the output of said amplifier circuitry disposed in said gas flow path.

10. Microcalorimetry apparatus comprising structure defining a chamber, including structure defining a gas flow inlet passage connected to said chamber and a gas flow outlet passage connected to said chamber, a plurality of calorimeter units supported in said chamber in spaced relation to one another, each said calorimeter unit including structure of thermal insulation defining a compartment for receiving a sample container, thermally conductive structure in said compartment, said thermally conductive structure being configured to mate with the outer wall of said sample container so that said thermally conductive structure and said container are in thermal contact,
- means in contact with said thermally conductive structure for supplying heat to said compartment,
- a calorimeter unit temperature sensor secured to said thermally conductive structure for providing an output signal as a function of the heat content of material in said compartment, means for connecting said heat supply means and said temperature sensor to electrical circuitry external of said thermal insulation,
- and thermally insulated closure structure cooperative with said compartment defining structure for enclosing a sample container within said compartment,
- thermal insulation enclosing said chamber,
- means to continuously supply gas along a gas flow path from said gas flow inlet passage through said chamber to said gas flow outlet passage to maintain a positive pressure in said chamber sufficient to cause continuous flow of gas through said chamber and around said individual spaced calorimeter units, means to stabilize the temperature of the gas continuously supplied to said chamber, a reference sensor in said chamber connected to provide a reference signal, and comparison circuitry responsive to said reference signal and the output signal of a calorimeter unit temperature sensor for equilibration of a sample in said calorimeter unit.

11. A method for detecting bacterial growth comprising the steps of placing a sample in a calorimeter, sensing the heat production in the sample under analysis and sensing for a positive derivative of the rate of said heat production.

12. The method as claimed in claim 11 wherein said positive derivative step includes sensing the difference between the heat produced during successive intervals of time.

13. Apparatus for use in detecting bacterial growth comprising structure defining a chamber, including structure defining a gas flow inlet passage connected to said chamber and a gas flow outlet passage connected to said chamber, a plurality of calorimeter units supported in said chamber in spaced relation to one another, each said calorimeter unit comprising structure of thermal insulation defining a compartment for receiving a sample container, thermally conductive structure in said compartment, said thermally conductive structure being configured to mate with the outer wall of said sample container so that said thermally conductive structure and the outer wall of said container are in thermal contact, means in contact with said thermally conductive structure for supplying heat to said compartment, a calorimeter unit temperature sensor secured to said thermally conductive structure for providing an output signal as a function of the heat content of material in said compartment, means for connecting said heat supply means to electrical circuitry external of said thermal insulation, and means to connect detector means to said temperature sensor for detecting heat production by a sample in said calorimeter unit, means to continuously supply gas along a gas flow path from said gas flow inlet passage through said chamber to said gas flow outlet passage to maintain a positive pressure in said chamber sufficient to cause continuous flow of gas through said chamber and around said individual spaced calorimeter units, and means to stabilize the temperature of the gas continuously supplied to said chamber.

14. The apparatus as claimed in claim 13 and further including a reference temperature sensor in said chamber for providing a reference signal and electronic circuitry connected to a calorimeter unit temperature sensor, said reference temperature sensor and said heat supplying means for comparing said unit sensor output signal and said reference signal and controlling the application of heat to said thermally conductive structure of the calorimeter unit for equilibration of a sample disposed therein.

15. The apparatus as claimed in claim 13 and further including and a gas flow outlet passage connected to said chamber, thermal insulation enclosing said chamber, at least a portion of said thermal insulation being porous, and wherein said means to supply gas along a gas flow path to said chamber to maintain a positive pressure in said chamber causes continuous flow of gas through said porous insulation and.

16. The apparatus as claimed in claim 15 and further including a reference temperature sensor in said chamber for providing a reference signal and electronic circuitry connected to a calorimeter unit temperature sensor, said reference temperature sensor and said heat supplying means for comparing said unit sensor output signal and said reference signal and controlling the application of heat to said thermally conductive structure of the calorimeter unit for equilibration of a sample disposed therein.

17. The apparatus as claimed in claim 16 and further including electronic circuitry responsive to each said sensor, the electronic circuitry coupled to said reference sensor providing said reference signal and the electronic circuitries coupled to the others of said sensors each including a summing junction to which said reference signal is applied to control operation of the associated calorimeter unit heater means.

18. The apparatus as claimed in claim 17 and further including fan means and a series of heater stages disposed in said gas flow path, each said heater stage having an associated temperature sensor, the sensor associated with the final heater stage being disposed in said chamber, and electronic circuitry responsive to each sensor for controlling the associated heater element, said electronic circuitry being disposed in an electronics compartment and said gas, after being exhausted from said chamber through said porous insulation, flows into said electronics compartment and is exhausted from said compartment to the atmosphere.

* * * * *

UNITED STATES PATENT OFFICE
CERTIFICATE OF CORRECTION

Patent No. 3,765,237              Dated   November 28, 1973

Inventor(s)  David E. Blackmer et al.

It is certified that error appears in the above-identified patent and that said Letters Patent are hereby corrected as shown below:

Column 1, line 54, "ot" should be --to--;

Column 5, line 47, "haing" should be --having--;

Column 10, lines 2-3, delete "and a gas flow outlet passage connected to said chamber,";

line 8, delete "and";

Column 10, after line 38, add Claim 19 as follows:

--19. The apparatus as claimed in claim 14 and further including electronic circuitry responsive to each said sensor, the electronic circuitry coupled to said reference sensor providing said reference signal and the electronic circuitries coupled to the others of said sensors each including a summing junction to which said reference signal is applied to control operation of the associated calorimeter unit heater means.--

Signed and sealed this 25th day of June 1974.

(SEAL)
Attest:

EDWARD M. FLETCHER, JR.
Attesting Officer

C. MARSHALL DANN
Commissioner of Patents